United States Patent Office 2,876,254
Patented Mar. 3, 1959

2,876,254

PREPARATION OF ESTERS FROM OLEFINS, CARBON MONOXIDE AND ALCOHOLS WITH A CATALYST COMPRISING AN ALCOHOL-SOLUBLE SALT OF A NOBLE METAL OF GROUP VIII AND AN ALCOHOL-SOLUBLE SALT OF TIN OR GERMANIUM

Edward L. Jenner and Richard V. Lindsey, Jr., Wilmington, Del., assignors to E. I. du Pont de Nemours and Company, Wilmington, Del., a corporation of Delaware No Drawing. Application April 4, 1957
Serial No. 650,545

22 Claims. (Cl. 260—486)

This invention relates to a process for preparing carboxylic acid esters. More particularly, this invention relates to a new catalytic process for the preparation of carboxylic acid esters.

It is known that esters are formed when olefins are carbonylated in the presence of primary alcohols and cobalt-containing catalysts (U. S. Patent No. 2,542,767). If the primary alcohol is replaced by a secondary alcohol and the cobalt-containing catalyst by platinum, the product is then a ketone instead of an ester (U. S. Patent No. 2,526,742). On the other hand, if free-radical producing catalysts are employed the products are polymeric hydroxyketoesters (U. S. Patent No. 2,557,256).

It is an object of this invention to provide a new catalytic process for the preparation of carboxylic acid esters. A further object is to provide a new and improved catalytic process for preparing carboxylic acid esters from non-aromatic unsaturated hydrocarbons, primary and secondary monohydric alcohols and carbon monoxide. A still further object is to provide a novel and improved catalytic process for the preparation of carboxylic acid esters in relatively high yields by the carbonylation of olefins with primary and secondary monohydric alcohols. Another object is to provide a novel catalytic process for preparation of carboxylic acid esters, such as acrylic acid esters, from readily available and relatively inexpensive non-aromatic unsaturated hydrocarbons, primary and secondary monohydric alcohols and carbon monoxide. Other objects will appear hereinafter.

These and other objects of this invention are accomplished by a new catalytic process for preparing carboxylic acid esters which comprises reacting a non-aromatic unsaturated hydrocarbon in which each of the plurally bonded carbon atoms is bonded directly to not more than one other carbon atom with carbon monoxide and with a primary or secondary monohydric alcohol in the presence of a catalyst which is a combination of an alcohol-soluble tin or germanium salt with an alcohol-soluble salt of a noble metal from group VIII, and obtaining as the resulting product an aliphatic or cycloaliphatic hydrocarbon monocarboxylic acid ester. It has been found that if the carbonylation of non-aromatic unsaturated hydrocarbons in which the remaining valences of the plurally bonded carbons are joined directly to not more than one other carbon atom is effected in the presence of a primary or secondary monohydric alcohol, i. e., a monohydric alcohol having hydrogen attached to the carbon atom bearing the hydroxyl group, with a catalyst combination of the aforementioned kind, i. e., combination of an alcohol-soluble salt of a metal of group IV-B of the periodic table according to Mendeleef (see Mellor's Modern Inorganic Chemistry, Parkes and Mellor, Longman's, Green and Co., London, 1941, page 118) having an atomic number between 31 and 51, i. e. tin or germanium, with an alcohol-soluble salt of a noble metal of group VIII of the periodic table, the resulting products are carboxylic acid esters.

In one method of operating the process of this invention, a pressure reactor is charged with a primary or secondary monohydric alcohol and catalyst containing at least 0.0001 mole of noble metal per mole of alcohol, the charged reactor is then cooled to 0° C. or below and purged of oxygen by vacuation or other means known to those skilled in the art. The reactor is then connected to a source of the unsaturated hydrocarbon and carbon monoxide and placed on an agitating rack equipped with heating means. The unsaturated hydrocarbon and carbon monoxide are injected into the reactor in amount sufficient to provide a pressure of 100 to 3000 atmospheres at reaction temperature and the charge is agitated and heated at a temperature in excess of 30° C. for from 30 minutes to 30 hours. During this reaction time, carbon monoxide is injected periodically to maintain the pressure at the level selected for operation. Thereafter the reaction mixture is permitted to cool, the reactor is opened, and discharged. The reaction product is then subjected to distillation to isolate the desired carboxylic acid ester product.

The examples which follow are submitted to illustrate and not to limit this invention. Parts are by weight unless otherwise stated.

*Example I*

A solution was prepared by mixing together 0.53 part of platinous chloride ($PtCl_2$), 2.25 parts of stannous chloride dihydrate, and a solution of 1.7 parts of hydrogen chloride in 8 parts of water.

The above solution was added to 39 parts of methanol contained in a silver-lined pressure vessel. There was then added 25 parts of ethylene, the mixture was heated to 200° C. under a carbon monoxide pressure of 980 atmospheres. These conditions were maintained for 16 hours with agitation. The reaction mixture was cooled to 20° C., carbon monoxide and ethylene were vented, the reactor was discharged, and the liquid product distilled. The distillate amounted to 44 parts. It was diluted with an equal quantity of water and the organic phase which separated was removed. The product amounted to 25 parts (32% yield based on the ethylene charged) and had an $n_D^{25}$ of 1.3731. It was fractionally distilled and the fraction boiling ca. 72° C., $n_D^{25}$ 1.3738 was identified as methyl propionate by comparing its infrared spectrum with that of authentic methyl propionate.

*Example II*

To 39 parts of methanol there was added a solution of 2.2 parts of stannous chloride dihydrate in 6.8 parts of methanol and 0.41 part of chloroplatinic acid, $H_2PtCl_6$, in 0.7 part of methanol. The resulting solution was charged into a silver-lined pressure vessel which was subsequently cooled and evacuated to remove oxygen. Twenty-eight parts of ethylene was then pressured into the vessel, and the charge heated to 80° C. under a carbon monoxide pressure of 800 atm. This temperature was maintained with agitation for 16 hours, during which time carbon monoxide was intermittently repressured as required to maintain the pressure. The total pressure drop was 365 atm. The mixture was cooled to room temperature and the carbon monoxide and ethylene were vented through a trap cooled to −70° C. The liquid product (99 parts) was washed with concentrated aqueous calcium chloride solution to remove methanol, whereupon 82 parts of methyl propionate was obtained. This is a 93% yield based on the ethylene employed.

The above example was repeated at 70° C. using 0.82 part of chloroplatinic acid, $H_2PtCl_6$, and 4.2 parts of stannic chloride hydrate as catalyst, and 75 parts of ethylene. From the reaction mixture there was recovered 230 parts of methyl propionate.

*Example III*

To 93 parts of methanol there was added a solution of 2.3 parts of stannous chloride dihydrate in 3.3 parts of methanol and a solution of 0.41 part chloroplatinic acid, $H_2PtCl_6$, in 0.7 part of methanol. This solution was charged into a silver-lined pressure vessel which was heated to 70° C. and pressured to 1000 atm. with a mixture of equal parts of ethylene and carbon monoxide. Over a period of 16 hours, during which the mixture was agitated, the pressure drop amounted to 845 atm. Methyl propionate (183 parts) was isolated as in the above example. Upon distillation, there was obtained methyl propionate, B. P. 80–80.5° C., $n_D^{25}$ 1.3742, sap. eq. 87. The infrared spectrum was identical with that of an authentic sample of methyl propionate.

A sample of the above methy propionate was saponified with sodium hydroxide and the solution was then acidified. The aqueous acid thus formed was dried by co-distilling the water with benzene. The anhydrous acid thus obtained was distilled. The product had a B. P. of 141–142° C., $n_D^{25}$ 1.3842, N. E. 73.4 (theoretical for propionic acid, 74.1).

Following the above procedure using 0.5 part of osmic acid and 2.25 parts of stannous chloride dihydrate at 250° C. there was obtained 8 parts of a water-insoluble product whose infrared spectrum showed it to consist of diethyl ketone and methyl propionate.

Following the above procedure, using 0.74 part of bromoplatinic acid and 2.5 parts of stannous bromide at 90° C. there was obtained 36 parts of methyl propionate.

*Example IV*

To 95 parts of ethyl alcohol, there was added 2.25 parts of stannous chloride dihydrate and 0.4 part of chloroplatinic acid $H_2PtCl_6$. This mixture was heated in a silver-lined pressure vessel to 80° C. and pressured to 800 atm. with a mixture of equal parts of ethylene and carbon monoxide. After a reaction period of 16 hours, ethyl propionate (178 parts) was isolated as described in the previous examples. Distillation gave ethyl propionate, B. P. 95° C., $n_D^{25}$ 1.3810. Its infrared spectrum was identical to the known spectrum of ethyl propionate. Analysis: Sap. eq. calc'd for $C_5H_{10}O_2$: 102. Found: 102.

*Example V*

Example IV was repeated, except that isopropyl alcohol (94 parts) was used in place of the ethyl alcohol. In a 16-hour reaction time, the yield of isopropyl propionate obtained amounted to 83 parts. This product boiled at 104–109° C. and had an $n_D^{25}$ of 1.3835. Its infrared spectrum was identical with the known spectrum of isopropyl propionate. Sap. eq. calc'd for $C_6H_{12}O_2$: 116. Found, 114.

*Example VI*

To 114 parts of cyclohexanol, there was added 4.5 parts of stannous chloride dihydrate, and a solution of 0.8 part of $H_2PtCl_6$ in 1.3 parts of methanol. This solution was heated to 80° C. and pressured to 900 atm. with a mixture of equal parts of ethylene and carbon monoxide. The mixture was maintained at 80° C. for 16 hours with agitation. The crude product (186 parts) distilled to give 121 parts of cyclohexyl propionate, B. P. 66–68° C./10 mm., $n_D^{25}$ 1.4385. Sap. eq. calc'd for $C_9H_{16}O_2$: 156. Found, 156.

*Example VII*

A solution was prepared from 47 parts of methanol, 4.5 parts of stannous chloride dihydrate, and 0.82 part of chloroplatinic acid, $H_2PtCl_6$. This was charged into a silver-lined pressure vessel and 40 parts of propylene was added. The mixture was then heated to 80° C. and carbon monoxide was supplied at 800 atm. During the 16 hours allowed for the reaction, the pressure drop totalled 275 atm. The crude product (98 parts) was washed with concentrated aqueous calcium chloride solution, whereupon 72 parts (74% yield) of methyl butyrates were obtained, $n_D^{25}$ 1.3838. The infrared spectrum of this product indicated that it was a mixture of approximately equal amounts of methyl n-butyrate and methyl isobutyrate.

*Example VIII*

To 82 parts of cyclohexene, there was added a solution prepared from 47 parts of methanol, 0.82 part of chloroplatinic acid $H_2PtCl_6$, and 4.5 parts of stannous chloride dihydrate. This mixture was heated to 80° C. under a carbon monoxide pressure of 800 atm. and held there with agitation for 16 hours. The reaction mixture was washed with concentrated aqueous calcium chloride solution and the organic layer was distilled. After the distillation of the cyclohexene, there distilled a fraction (1 part), B. P. 45° C./5 mm., $n_D^{25}$ 1.4480. This was identified as the methyl ester of cyclohexane-carboxylic acid by comparing its infrared spectrum with that of an authentic sample.

*Example IX*

To 95 parts of ethanol, there was added 4.5 parts of stannous chloride dihydrate and a solution of 1.23 parts of chloroplatinic acid $H_2PtCl_6$, in 2 parts of methanol. This solution was charged into a silver-lined pressure vessel and 54 parts of butadiene was added. It was then heated with agitation to 90° C. and pressured with 950 atm. of carbon monoxide. After 16 hours the reaction mixture was cooled and the excess carbon monoxide and butadiene vented. The mixture was given a preliminary distillation at a pressure of approximately 10 mm. of mercury to separate the volatile product and reactants from the catalyst. Upon redistillation, impure ethyl pentenoate was obtained, B. P. 69–72° C./50 mm., $n_D^{25}$ 1.4072. Sap. eq. calc'd for $C_7H_{12}O_2$: 128. Found, 132. Its infrared spectrum had absorption for ester carbonyl and for unconjugated ethylenic carbon-carbon unsaturation.

*Example X*

A silver-lined pressure vessel was charged with 96 parts of methanol, 1.2 parts of chloroplatinic acid ($H_2PtCl_6$), 4.5 parts of stannous chloride dihydrate, and 40 parts of allene. The vessel was pressured with carbon monoxide to 975 atm. and held at 90° C. with agitation for a reaction period of 16 hours. The mixture was cooled, carbon monoxide and allene were vented, and the volatile components were distilled at reduced pressure (3 mm.) to separate the product from the nonvolatile metal compounds. The distillate, a solution of methyl methacrylate in methanol, was washed with aqueous calcium chloride solution to remove methanol, whereupon 39 parts of methyl methacrylate was obtained. It was identified by comparing its infrared spectrum with that of an authentic sample of methyl methacrylate.

*Example XI*

A solution of 0.8 part of chloroplatinic acid ($H_2PtCl_6$) and 4.5 parts of stannous chloride dihydrate in 96 parts of n-butyl alcohol was treated with ethylene and carbon monoxide as described in Example IV. Distillation of the product gave 140 parts of n-butyl propionate, B. P. 142–145° C., $n_D^{25}$ 1.3985.

*Example XII*

Twenty parts of methylacetylene was added to 112 parts of chloroplatinic acid ($H_2PtCl_6$) and 4.5 parts of stannous chloride dihydrate dissolved in 95 parts of methanol. This mixture was pressured with carbon monoxide at 1000 atmospheres and held for 15 hours at 100° C. Distillation of the mixture, followed by washing the distillate with aqueous calcium chloride solution, gave 9 parts of crude ester. Distillation of this material gave a fraction, B. P. 95–105° C., $n_D^{25}$ 1.4093. This was characterized by its infrared spectrum as a mixture containing methyl methacrylate and a minor quantity of methyl crotonate. Saponification equivalent, calc'd for $C_5H_8O_2$: 100. Found: 112.

Example XIII

A mixture of 56 parts of cis-2-butene, 2.1 parts of chloroplatinic acid, 6.75 parts of stannous chloride dihydrate and 95 parts of methanol was heated at 80° C. under carbon monoxide pressure of 960 atmospheres. Distillation of the product, followed by washing with calcium chloride solution, gave 22 parts of ester, $n_D^{25}$ 1.3912. Fractional distillation gave the methyl ester of methylethylacetic acid, B. P. 112–114° C., $n_D^{25}$ 1.3920. Saponification equivalent, calc'd for $C_6H_{12}O_2$: 116. Found: 120.

Example XIV

A pressure reactor was charged with 102 parts of methanol, 2.14 parts of germanium tetrachloride, and 0.337 part of platinic chloride. The reactor was cooled, evacuated, pressured with a 1:1 mixture of carbon monoxide and ethylene, and shaken at 80° C. and 1000 atmospheres pressure for 10 hours. A pressure drop of 220 atmospheres occurred during this period. There was removed from the shaker tube 125 parts of clear colorless liquid which was distilled rapidly through a fractionating column at 26 mm. pressure. This distillate was then fractionally distilled through a packed column. A total of 58.5 parts of a methanol-methyl propionate azeotrope, B. P. 62.5° C., was obtained. This liquid was added to twice its volume of aqueous calcium chloride solution and methyl propionate was separated.

Example XV

A pressure reactor was charged with 79 parts of methanol, 4.28 parts of germanium tetrachloride, and 0.208 part of ruthenium trichloride. The reactor was cooled, evacuated, and pressured with a 1:1 mixture of carbon monoxide and ethylene. The mixture was shaken at 90° C. and 1000 atomspheres pressure for 10 hours. A pressure drop of 135 atmospheres was observed during the reaction period. There was obtained 105 parts of clear greenish-yellow liquid. This was added to 100 ml. of aqueous calcium chloride solution and approximately 2 ml. of organic phase containing methyl propionate was separated.

Example XVI

A pressure reactor was charged with 79 parts of methanol, 0.6740 part of platinic chloride and 2.14 parts of germanium tetrachloride. The reactor was cooled, evacuated, and 40 parts of allene was added. The reactor was then pressured with carbon monoxide and shaken at 120–160° C. and 400–940 atmospheres pressure for 10 hours. There was obtained 107 parts of clear red-brown liquid. The product was distilled rapidly at ca. 20 mm. pressure and 78 parts of condensate was collected in a trap cooled in solid carbon dioxide. This liquid was added to twice its volume of an aqueous solution of calcium chloride and 30 parts of organic liquid was separated. This material was then distilled through a packed column. From this distillation, there was obtained 10 parts of a product boiling at 51–54.3° C./156 mm. and having the characteristic infrared absorption for methyl methacrylate.

Example XVII

A pressure reactor was charged with 111 parts of methanol, 2.09 parts of rhodium chloride and 4.28 parts of germanium tetrachloride. The reactor was cooled, evacuated, and 40 parts of allene was added. The system was pressured with carbon monoxide and the reactants were shaken at 123–156° C. and 465–950 atmospheres pressure for 10 hours. A pressure drop of 160 atmospheres was observed during this reaction period. There was recovered 76.5 parts of a black liquid and 51 parts of black polymer. The liquid was distilled rapidly through a fractionating column at 10 mm. pressure. There was collected 31 parts of liquid in a receiver cooled in solid carbon dioxide. The condensate was added to two times its volume of aqueous calcium chloride solution. This solution was then extracted with carbon tetrachloride. The infrared absorption of the carbon tetrachloride solution indicated that it contained an ester.

Example XVIII

A pressure reactor was charged with 86.9 parts of methanol, 0.75 part of iridium chloride, and 1.07 parts of germanium tetrachloride. The reactor was cooled, evacuated, 40 parts of allene was added, and the system pressured with carbon monoxide. The reactants were shaken at 90–185° C. and 600–900 atmospheres pressure for 10 hours. A pressure drop of 120 atmospheres occurred during this period. There was obtained 104 parts of dark colored liquid and 11 parts of black polymeric solid. The liquid was distilled through a fractionating column at 12 mm. pressure. The distillate amounted to 59 parts and was collected in a receiver cooled in solid carbon dioxide. This was added to aqueous calcium chloride solution. The calcium chloride solution was extracted with carbon tetrachloride. The infrared absorption of the carbon tetrachloride solution indicated that there was present unsaturated aliphatic ester and aromatic ester. A higher boiling fraction, B. P. 65–113° C./1 mm., $n_D^{25}$ 1.4835, was also obtained. This fraction was shown by infrared analysis to consist of an unsaturated ester in which the unsaturation was not conjugated with the carbonyl.

Example XIX

A pressure reactor was charged with 79 parts of methanol, 0.75 part of iridium trichloride, and 0.95 part of stannous chloride. The reactor was cooled, evacuated, and 40 parts of allene was added. The system was pressured with carbon monoxide and shaken at 140–180° C. and 700–950 atmospheres pressure for 10 hours. A pressure drop of 105 atmospheres was observed during this period of reaction. The product consisted of 111 parts of dark brown liquid. This was distilled rapidly through a fractionating column at 10 mm. pressure. There was collected 97 parts of distillate in a receiver cooled in solid carbon dioxide. The condensate was added to twice its volume of aqueous calcium chloride solution and 2.4 parts of organic phase separated. The aqueous phase was extracted with carbon tetrachloride to which the initial organic product was added. The infrared absorption of the carbon tetrachloride solution indicated that there was present methyl methacrylate and aromatic compounds.

Example XX

A pressure reactor was charged with 83 parts of methanol, 0.177 part of palladium dichloride, and 0.535 part of germanium tetrachloride. The reactor was cooled and evacuated and 40 parts of allene was added. The system was pressured with carbon monoxide and the reactants were shaken at 140–225° C. and 400–1000 atmospheres pressure for 10 hours. A pressure drop of 220 atmospheres occurred during the reaction. The product amounted to 117 parts and was a light brown liquid. It was distilled through a fractionating column at 10 mm. pressure and there was obtained 74 parts of condensate in a receiver cooled in solid carbon dioxide. The condensate was added to twice its volume of aqueous calcium chloride solution and 3 parts of organic phase separated. The infrared absorption of this material indicated that it was mainly methyl methacrylate and contained trace amounts of aromatic compounds.

Example XXI

A pressure reactor was charged with 79 parts of methanol, 0.177 part of palladium chloride, and 0.298 part of stannous chloride. The reactor was cooled and evacuated and 40 parts of allene was added. The system was pressured with carbon monoxide and shaken at 140–225° C. and 400–1000 atmospheres pressure for 10 hours. A pressure drop of 190 atmospheres was observed during the reaction. The product consisted of 112 parts of dark brown liquid. This was distilled through a fractionating column at 10 mm. pressure and 78 parts of product condensed in a receiver cooled in solid carbon dioxide. This condensate was added to aqueous calcium chloride solution and 3.53 parts of organic phase was recovered. The calcium chloride solution was then extracted with carbon tetrachloride and this extract was combined with the 3.53 parts of organic material. Infrared analysis of the carbon tetrachloride solution showed that it contained methyl methacrylate and other esters. A fraction amounting to 8 parts and boiling at 61–146° C./2 mm. was also obtained. Infrared analysis showed that this product was an unsaturated aliphatic ester.

Example XXII

The catalyst was prepared by reacting one part of 40% platinic chloride dissolved in 5 parts of water with 2 parts of 98% sulfuric acid. This solution was evaporated to dryness to leave a dark, hard residue which was dissolved in 79 parts of methanol to give a light yellow solution, which was 0.0012 molar in platinic sulfate. To this solution, there was added 5 parts of 0.48 molar stannous sulfate solution in water. The catalyst solution was placed in a pressure reactor, the reactor was then cooled, evacuated, and pressured with a 1:1 mixture of carbon monoxide and ethylene. The charge was shaken at 80°–130° C. and 700–1000 atmospheres for 10 hours. A pressure drop of 25 atmospheres was observed at 130° C. during this reaction period. There was obtained 66 parts of a light tan liquid which was distilled through a fractionating column at 3 mm. The distillate was made up of 56 parts of liquid, which condensed in a receiver cooled in solid carbon dioxide, and 2.3 parts which boiled at 33° C./3 mm. and had an $n_D^{25}$ of 1.3405. The distillates were combined and added to twice their volume of aqueous calcium chloride. About 2 parts of organic phase separated, and the aqueous layer was extracted three times with carbon tetrachloride. The organic material was added to this extract. The carbon tetrachloride solution was dried over anhydrous magnesium sulfate. Infrared analysis indicated that it contained methyl propionate and a small amount of ketone, probably diethyl ketone.

Example XXIII

The catalyst was prepared by reacting 0.5 part of ruthenium dioxide with approximately 30 parts of 48% aqueous hydrogen bromide. The ruthenium tribromide was isolated by evaporating the reaction mixture to dryness. Stannous bromide was prepared by reacting 5 parts of stannous oxide with approximately 30 parts of 48% aqueous hydrogen bromide. The reaction mixture was evaporated to dryness to leave light yellow hydrated stannous bromide. A pressure reactor was then charged with 79 parts of a 0.01 molar ruthenium bromide solution in methanol and 1 part of stannous bromide. The reactor was cooled, evacuated, and pressured with a 1:1 mixture of carbon monoxide and ethylene. The reactants were shaken at 250° C. for 10 hours. During this time a pressure drop of 355 atmospheres was observed. There was recovered from the reactor 105 parts of clear tan liquid which was distilled at 3 mm. pressure. The distillate was made up of 5 parts of liquid, B. P. 48° C./3 mm. which had $n_D^{25}$ of 1.3980 and 72 parts of liquid which condensed in a receiver cooled in solid carbon dioxide. The distillates were combined and added to twice their volume of aqueous calcium chloride. There was separated 21.5 parts of organic liquid which had an $n_D^{25}$ of 1.3844. This material was dried over anhydrous magnesium sulfate and fractionally distilled to yield the following fractions:

Fraction 1 consisted of 5 parts, boiled at 46–68° C. and had an $n_D^{25}$ of 1.3605. Infrared analysis indicated that this fraction was methyl propionate containing a small amount of diethyl ketone and methanol.

Fraction 2 consisted of 5 parts, boiled from 70–98° C. and had an $n_D^{25}$ of 1.3795. Infrared analysis showed that this fraction contained both methyl propionate and diethyl ketone and a trace of methanol.

Fraction 3 consisted of 2 parts, boiled from 99–101° C. and had an $n_D^{25}$ of 1.3912. Infrared analysis showed that this fraction was mainly diethyl ketone, but contained some methyl propionate and a trace of methanol.

There was also obtained 6.62 parts of yellow liquid which had a boiling point of 117° C./3 mm. and an $n_D^{25}$ of 1.4840. This material, as shown by infrared analysis, was a mixture of carbonyl compounds.

This application is a continuation-in-part of our co-pending parent patent application Ser. No. 594,361, filed June 28, 1956, now abandoned.

The non-aromatic unsaturated hydrocarbons which can be used in accordance with this invention are those olefinic hydrocarbons in which the doubly bonded carbon atoms are bonded directly to not more than one other carbon atom and acetylenic hydrocarbons. Suitable examples of such olefins and acetylenes are unsaturated aliphatic and cycloaliphatic hydrocarbons such as ethylene, propylene, cyclohexene, allene, butadiene, 2-butene, 1-pentene, 1-propyne, 1-butyne, 3-hexyne, and the like, particularly olefins, diolefins and acetylenic hydrocarbons of up to six carbon atoms. The simple monoolefins such as cyclohexene and the 2 to 4 carbon olefins, particularly the straight chain olefinic hydrocarbons, are preferred reactants because of their ready reactivity under relatively mild conditions of temperature and pressure.

The alcohols are the monohydric primary and secondary alkanols and the cycloalkanols, particularly of up to seven carbon atoms. Preferred alcohols are the monohydric primary and secondary alkanols containing from 1 to 3 carbons and cyclohexanols, i. e., six-membered cycloalkanols, preferably of not more than 7 carbon atoms. Examples are methanol, ethanol, propanol, and isopropyl alcohol, cyclohexanol, methylcyclohexanol, and the like.

The process of this invention is operated under a pressure which can vary from 100 to 3000 atmspheres but is generally from 300 to 1000 atmospheres, because under these conditions the reaction takes place at a reasonable rate with the production of the desired ester in good yield.

As illustrated by the examples, the temperature at which the reaction is carried out depends upon such interdependent factors as the catalyst and olefin being carbonylated. Temperatures in excess of 30° C. are used. As a rule it is not necessary to employ temperatures in excess of 325° C. Since the best results from the standpoint of reaction rate and yield of desired products are obtained in the range of 50° to 275° C., this embraces the temperature conditions generally used.

The catalyst used in the practice of this invention is a combination of an alcohol-soluble salt of tin or germanium with an alcohol-soluble salt of a noble metal from group VIII. The preferred salts are the halides and particularly those of halogens having an atomic number of at least 17. Especially preferred because of their solubility in alcohols, ready availability and good catalytic activity are the chlorides. Specific examples of alcohol-soluble salts of tin and germanium are stannous and stannic chlorides, bromides, fluorides, and iodides, germanium di- and tetrachlorides, and germanium tetrabromide, tetraiodide, and tetrafluoride, stannous and stannic sulfates, etc.

Specific examples of alcohol-soluble salts of noble metals of group VIII are ruthenium tri- and tetrachloride, ruthenium tribromide, rhodium trichloride tetrahydrate, palladium dichloride and dibromide, palladium nitrate, osmium di- and trichloride, iridium tetrabromide and tetrachloride, platinic bromide and chloride, platinic sulfate, and the like.

In the preparation of the catalysts used in this invention, molar ratios of alcohol-soluble tin or germanium salt to alcohol-soluble salt of group VIII noble metal of from 1:1 to 20:1 can be used. The amount of catalyst which can be employed can be varied widely but is generally about 0.0001 to about 0.1 mole of contained noble metal per mole of alcohol charged into the reactor.

The reaction between the non-aromatic unsaturated hydrocarbon, carbon monoxide, and alcohol can be carried out either batchwise, as illustrated in the illustrative examples, or semi-continuously, or continuously.

The relative proportions of reactants employed can be the stoichiometrically required quantities but this is not critical and amounts varying widely from these quantities can be used, if desired. Thus, the alcohol, acetylenic hydrocarbon or olefin, or carbon monoxide can be used in excess. When the alcohol is used in large excess over the stoichiometric amount it also functions as a reaction medium.

An inert reaction medium can be included in the charge but this is not necessary because the reaction occurs satisfactorily without it. Examples of suitable reaction media are cyclohexane, xylene, benzene, isooctane, dioxan, tetrahydrofuran and the like.

The time of reaction can be as short as 30 minutes or as long as 30 hours. Usually, however, the reaction is carried on until there is no further pressure drop. In order to insure maximum utilization of the non-aromatic unsaturated hydrocarbon component of the reaction it is generally desirable to inject carbon monoxide as required to maintain the pressure at the level selected for operation.

The process of this invention is efficient and makes possible the production of esters from cheap, abundantly available alcohols, non-aromatic unsaturated hydrocarbons, and carbon monoxide.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing carboxylic acid esters selected from the class consisting of aliphatic and cycloaliphatic hydrocarbon monocarboxylic acid esters which comprises bringing into contact and reacting carbon monoxide with a non-aromatic unsaturated hydrocarbon of up to six carbon atoms in which each of the plurally bonded carbon atoms is bonded directly to not more than one other carbon atom and with a monohydric alcohol of up to seven carbon atoms selected from the class consisting of alkanols and cycloalkanols and having hydrogen attached to the carbon atom bearing the hydroxyl group in the presence of a catalyst which is a combination of an alcohol-soluble salt of a metal selected from the class consisting of tin and germanium with an alcohol-soluble salt of a noble metal from group VIII of the periodic table.

2. Process for preparing carboxylic acid esters as set forth in claim 1 wherein said catalyst is a combination of a halogen salt of a metal selected from the class consisting of tin and germanium with a halogen salt of a noble metal from group VIII of the periodic table.

3. Process for preparing carboxylic acid esters as set forth in claim 1 wherein said monohydric alcohol is a monohydric alkanol of up to seven carbon atoms and having hydrogen attached to the carbon atom bearing the hydroxyl group.

4. Process for preparing carboxylic acid esters as set forth in claim 1 wherein said monohydric alcohol is a monohydric cycloalkanol of up to seven carbon atoms and having hydrogen attached to the carbon atom bearing the hydroxyl group.

5. Process for preparing carboxylic acid esters as set forth in claim 1 wherein said non-aromatic unsaturated hydrocarbon is an olefinic hydrocarbon of up to six carbon atoms in which each of the doubly bonded carbon atoms is bonded directly to not more than one other carbon atom.

6. Process for preparing carboxylic acid esters as set forth in claim 1 wherein said non-aromatic unsaturated hydrocarbon is an acetylenic hydrocarbon of up to six carbon atoms.

7. Process for preparing aliphatic hydrocarbon monocarboxylic acid esters which comprises bringing into contact and reacting carbon monoxide, at a temperature between 30 and 325° C. under a pressure of 100 to 3000 atmospheres, with an olefinic hydrocarbon of up to six carbon atoms in which each of the doubly bonded carbon atoms is bonded directly to not more than one other carbon atom and with a monohydric alkanol of up to seven carbon atoms and having hydrogen attached to the carbon atom bearing the hydroxyl group in the presence of a catalyst which is a combination of an alcohol-soluble salt of a metal selected from the class consisting of tin and germanium with an alcohol-soluble salt of a noble metal from group VIII of the periodic table.

8. Process for preparing aliphatic hydrocarbon monocarboxylic acid esters as set forth in claim 7 wherein said catalyst is a combination of a halogen salt of a metal selected from the class consisting of tin and germanium with a halogen salt of a noble metal from group VIII of the periodic table wherein the halogen in each of said salts has an atomic number of at least 17.

9. Process for preparing aliphatic hydrocarbon monocarboxylic acid esters as set forth in claim 7 wherein said catalyst is a combination of a chlorine salt of a metal selected from the class consisting of tin and germanium with a chlorine salt of a noble metal from group VIII of the periodic table.

10. Process for preparing aliphatic hydrocarbon monocarboxylic acid esters as set forth in claim 7 wherein said olefinic hydrocarbon in which each of the doubly bonded carbon atoms is bonded directly to not more than one other carbon atom is a straight chain olefinic hydrocarbon of 2 to 4 carbon atoms.

11. Process for preparing aliphatic hydrocarbon monocarboxylic acid esters as set forth in claim 7 wherein said monohydric alkanol having hydrogen attached to the carbon atom bearing the hydroxyl group is a primary monohydric alkanol of 1 to 3 carbon atoms.

12. Process for preparing aliphatic hydrocarbon monocarboxylic acid esters which comprises bringing into contact and reacting carbon monoxide, at a temperature between 30 and 325° C. under a pressure of 100 to 3000 atmospheres, with a straight chain olefinic hydrocarbon of 2 to 4 carbon atoms and with a primary monohydric alkanol of 1 to 3 carbon atoms in the presence of a catalyst which is a combination of an alcohol-soluble salt of a metal selected from the class consisting of tin and germanium with an alcohol-soluble salt of a noble metal from group VIII of the periodic table.

13. Process for preparing aliphatic hydrocarbon monocarboxylic acid esters as set forth in claim 12 wherein said catalyst is a combination of a halogen salt of a metal selected from the class consisting of tin and germanium with a halogen salt of a noble metal from group VIII of the periodic table wherein the halogen in each of said salts has an atomic number of at least 17.

14. Process for preparing aliphatic hydrocarbon monocarboxylic acid esters as set forth in claim 12 wherein said catalyst is a combination of a chlorine salt of tin with a chlorine salt of platinum.

15. Process for peparing aliphatic hydrocarbon monocarboxylic acid esters as set forth in claim 12 wherein said temperature is between 50° and 275° C. and said pressure is 300 to 1000 atmospheres.

16. Process for preparing aliphatic hydrocarbon monocarboxylic acid esters as set forth in claim 12 wherein said straight chain olefinic hydrocarbon of 2 to 4 carbon atoms is allene.

17. Process for preparing aliphatic hydrocarbon monocarboxylic acid esters as set forth in claim 12 wherein said straight chain olefinic hydrocarbon of 2 to 4 carbon atoms is ethylene.

18. Process for preparing aliphatic hydrocarbon monocarboxylic acid esters as set forth in claim 12 wherein said primary monohydric alkanol of 1 to 3 carbon atoms is methanol.

19. Process for preparing methyl methacrylate which comprises bringing into contact and reacting carbon monoxide, at a temperature between 50 and 275° C. under a pressure of 300 to 1000 atmospheres, with allene and with methanol in the presence of a catalyst which is a combination of an alcohol-soluble salt of a metal selected from the class consisting of tin and germanium with an alcohol-soluble salt of a noble metal from group VIII of the periodic table.

20. Process for preparing methyl methacrylate as set forth in claim 19 wherein said catalyst is a combination of a chlorine salt of tin with a chlorine salt of platinum.

21. Process for preparing a methacrylic acid ester which comprises bringing into contact and reacting carbon monoxide with allene and with a monohydric alcohol of up to seven carbon atoms selected from the class consisting of alkanols and cycloalkanols and having hydrogen attached to the carbon atom bearing the hydroxyl group in the presence of a catalyst which is a combination of an alcohol-soluble salt of a metal selected from the class consisting of tin and germanium with an alcohol-soluble salt of a noble metal from group VIII of the periodic table.

22. Process for preparing a lower alkyl methacrylate which comprises bringing into contact and reacting carbon monoxide, at a temperature between 30 and 325° C. under a pressure of 100 to 3000 atmospheres, with allene and with a primary monohydric alkanol of 1 to 3 carbon atoms in the presence of a catalyst which is a combination of a halogen salt of a metal selected from the class consisting of tin and germanium with a halogen salt of a noble metal from group VIII of the periodic table wherein the halogen in each of said salts has an atomic number of at least 17.

References Cited in the file of this patent
UNITED STATES PATENTS

| | | |
|---|---|---|
| 2,526,742 | Gresham et al. | Oct. 24, 1950 |
| 2,542,767 | Gresham et al. | Feb. 20, 1951 |
| 2,653,969 | Albrecht et al. | Sept. 29, 1953 |
| 2,739,169 | Hagemeyer | Mar. 20, 1956 |